US011577908B2

(12) United States Patent
Duman

(10) Patent No.: US 11,577,908 B2
(45) Date of Patent: Feb. 14, 2023

(54) CARTRIDGE, ASSEMBLY AND CUP FOR PREPARING LOOSE LEAF TEA AND METHOD OF PREPARING TEA

(71) Applicant: T-CAP IP B.V., Amsterdam (NL)

(72) Inventor: Hakan Duman, Amsterdam (NL)

(73) Assignee: T-CAP IP B.V., Amsterdam (NL)

( * ) Notice: Subject to any disclaimer, the term of this patent is extended or adjusted under 35 U.S.C. 154(b) by 0 days.

(21) Appl. No.: 16/606,134

(22) PCT Filed: Apr. 17, 2018

(86) PCT No.: PCT/NL2018/050241
§ 371 (c)(1),
(2) Date: Oct. 17, 2019

(87) PCT Pub. No.: WO2018/194450
PCT Pub. Date: Oct. 25, 2018

(65) Prior Publication Data
US 2020/0039738 A1     Feb. 6, 2020

(30) Foreign Application Priority Data

Apr. 19, 2017   (NL) ...................................... 2018743

(51) Int. Cl.
*B65D 85/812*   (2006.01)
*A47G 19/16*   (2006.01)
(Continued)

(52) U.S. Cl.
CPC ........... *B65D 85/812* (2013.01); *A47G 19/16* (2013.01); *A47G 19/2272* (2013.01);
(Continued)

(58) Field of Classification Search
CPC ................ B65D 85/812; B65D 85/816; B65D 51/2807; B65D 43/0212; A47G 19/16; A47G 19/2272; A47G 31/0615
(Continued)

(56) References Cited

U.S. PATENT DOCUMENTS 1,008,861  A  * 11/1911  Piaseczny ............... A47J 31/02
                                                                99/299
3,102,465  A     9/1963  Montesano
(Continued)

FOREIGN PATENT DOCUMENTS

AU       2011278538 B2    4/2015
CN        105433705 A     3/2016
(Continued)

OTHER PUBLICATIONS

International Search Report and Written Opinion for International Application No. PCT/NL2018/050241, dated Jul. 18, 2018.

*Primary Examiner* — Viren A Thakur
*Assistant Examiner* — Chaim A Smith
(74) *Attorney, Agent, or Firm* — Wolf, Greenfield & Sacks, P.C.

(57) ABSTRACT

A cartridge (1) for controlled brewing of loose-leaf tea in a cup, comprising an infusion chamber (2) for containing loose tea leaves (3) and infusing a liquid with substances from the tea leaves to brew tea. A chamber wall (20) impervious to the liquid defines the infusion chamber. In the chamber wall is a passage (21) between the infusion chamber and an exterior (5) thereof. The passage has an open state in which the infusion chamber is in liquid communication with the exterior, to transport the substances from the infusion chamber into liquid in the exterior during brewing tea. In a close state the infusion chamber inside is closed off from liquid in the exterior to stop a concentration of the substances in the liquid in the exterior from increasing. A (Continued)

manual control manually controllable by a human-being allows to bring the passage from the open state into the closed state.

18 Claims, 6 Drawing Sheets

(51) Int. Cl.
    *A47G 19/22*     (2006.01)
    *A47J 31/06*     (2006.01)
    *A47J 31/20*     (2006.01)
    *B65D 43/02*     (2006.01)
    *B65D 51/28*     (2006.01)
    *B65D 85/816*     (2006.01)

(52) U.S. Cl.
    CPC ........... *A47J 31/0615* (2013.01); *A47J 31/20* (2013.01); *B65D 43/0212* (2013.01); *B65D 51/2807* (2013.01); *B65D 85/816* (2013.01); *B65D 2543/00046* (2013.01); *B65D 2543/00092* (2013.01); *B65D 2543/00296* (2013.01); *B65D 2543/00527* (2013.01); *B65D 2543/00537* (2013.01); *B65D 2543/00629* (2013.01); *B65D 2543/00685* (2013.01); *B65D 2543/00731* (2013.01); *B65D 2543/00796* (2013.01)

(58) Field of Classification Search
    USPC .................................... 426/115; 99/323, 322
    See application file for complete search history.

(56) References Cited

U.S. PATENT DOCUMENTS

| | | | |
|---|---|---|---|
| 3,657,994 A * | 4/1972 | Post | A47J 31/20 99/323 |
| 8,734,874 B1 * | 5/2014 | Paolone | A23F 5/243 220/254.1 |
| 2012/0012008 A1 * | 1/2012 | Kwok | A47J 31/0615 99/299 |
| 2018/0078080 A1 * | 3/2018 | Drummond | A47J 31/0636 |

FOREIGN PATENT DOCUMENTS

| | | |
|---|---|---|
| DE | 20 2006 005941 U1 | 6/2006 |
| WO | WO 2013/162438 A1 | 10/2013 |
| WO | WO 2016/205561 A2 | 12/2016 |

* cited by examiner

CARTRIDGE, ASSEMBLY AND CUP FOR PREPARING LOOSE LEAF TEA AND METHOD OF PREPARING TEA

CROSS-REFERENCE TO RELATED APPLICATIONS

This application is a national stage filing under 35 U.S.C. § 371 of international application no. PCT/NL2018/050241, filed Apr. 17, 2018, which claims the benefit of Dutch application no. 2018743, filed Apr. 19, 2017, each of which is herein incorporated by reference in its entirety.

FIELD OF THE INVENTION

The invention relates to cartridges, assemblies and cups for preparing loose leaf tea and methods of preparing tea from loose leaves.

BACKGROUND OF THE INVENTION

Solutions for the preparation of hot beverages are known, as well as the preparation of hot beverages. However, although proposals have been made in the prior art until today no solutions for the preparation of loose leaf tea have been made available on the market and the proposed solutions are unsatisfactory. This also applies to the preparation of other beverages.

For example, United States patent application publication US20060226147 discloses a disposable lid for a cup which provides for use of a beverage bag unit comprising a beverage bag and a drawstring connected to the beverage bag. The lid comprises a flange for attachment to a cup and a body unit comprising a body section including an aperture through which the drawstring is slideable, and at least one wing member operable to allow a user to squeeze and/or hold the beverage bag when in a raised position.

However, to control the strength of the tea the bag has to be removed from the cup. This is cumbersome and results in a messy situation where the user is confronted with a wet beverage bag. Although the beverage can be squeezed out of the beverage bag to prevent dripping, still the beverage bag will be wet after taking out and thus risks a messy situation.

SUMMARY OF THE INVENTION

The present invention provides a cartridge, an assembly and a cup for preparing loose leaf tea, as well as a method of preparing tea, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

In the following, details will not be explained in any greater extent than that considered necessary for the understanding and appreciation of the underlying concepts of the present invention and in order not to obfuscate or distract from the teachings of the present invention.

Figure 1:
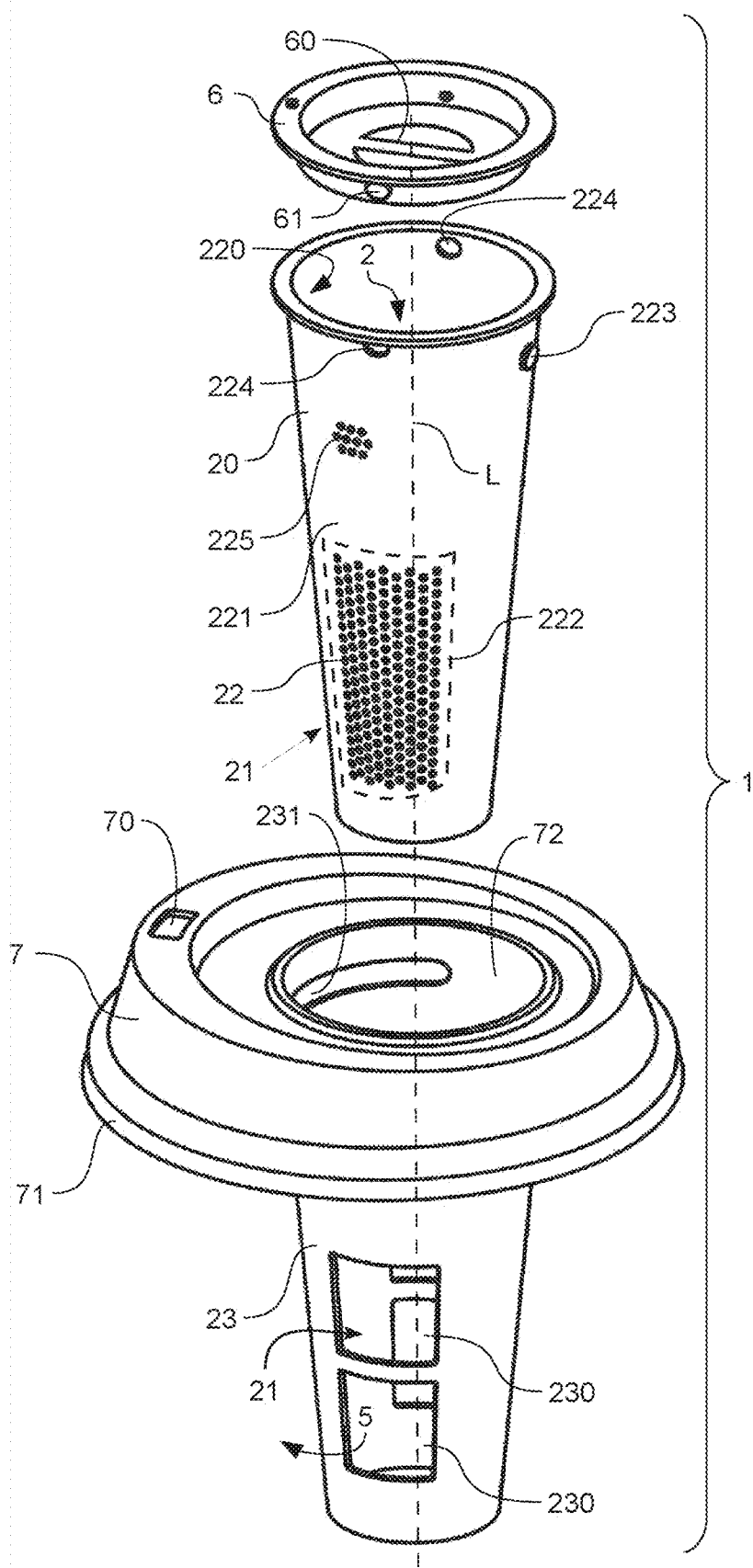
FIG. 1 schematically shows an exploded perspective view of an example of a cartridge.

Referring to FIG. 1, an example of a cartridge 1 for controlled brewing of loose-leaf tea in a cup is shown therein. The cartridge as used herein may be a prefabricated receptacle that can be easily inserted in, and attached to, a drinking cup from which a human consumer will drink the beverage and which allows a controllable release of flavouring substances into a consumable liquid in the cup, controlled by the consumer. In the receptacle e.g. loose tea leaves (or other flavouring substances) can be provided to be controllable released into a liquid in the cup, e.g. be extraction or solution. The cartridge may be such that it can be closed-off to keep the flavouring substances into the receptacle, at least until the consumer releases them into the liquid. The cartridge may be permanently or releasably attachable to the cup, e.g. by laterally moving the cartridge into the cup without rotation. For example, the cartridge may be pressed on the rim of the cup to lock an interlocking mechanism. In case of a releasable attachment, the cartridge may be replaced with another interchangeable cartridge, for instance in case of a non-disposable cup.

The shown example of a cartridge 1 comprises an infusion chamber 2 for containing loose tea leaves 3 and infusing the portion 40 of the liquid 4 inside the infusion chamber 2 with substances from the tea leaves 3 to brew tea. As shown, the infusion chamber 2 is defined by a chamber wall 20 which is impervious to the liquid 4. In the chamber wall 20, a passage 21 is provided between the infusion chamber 2 and an exterior 5 thereof, i.e. the rest of the cup 100 when placed thereon.

Figure 2:
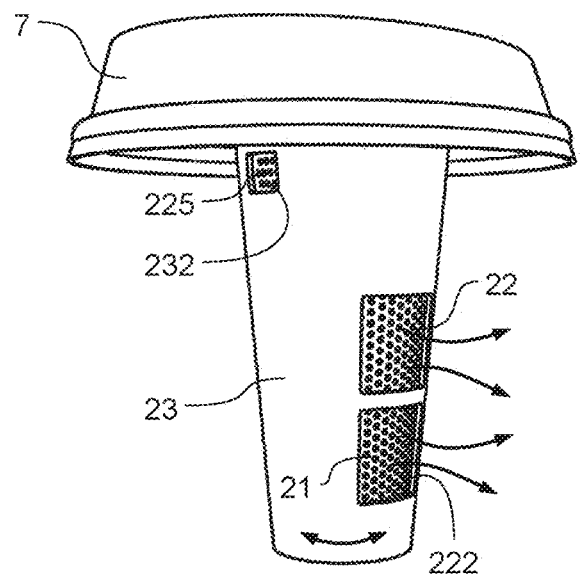
FIG. 2 schematically shows a perspective view of the example of FIG. 1 in a first state.

The passage 21 has an open state, as illustrated in FIG. 2, in which the infusion chamber 2 is in liquid communication with the exterior 5, to transfer, as indicated with the arrows, the substances from the liquid 40 in the infusion chamber into the portion of the liquid 41 in the exterior 5 during brewing tea, e.g. through convection and/or diffusion.

Figure 3:
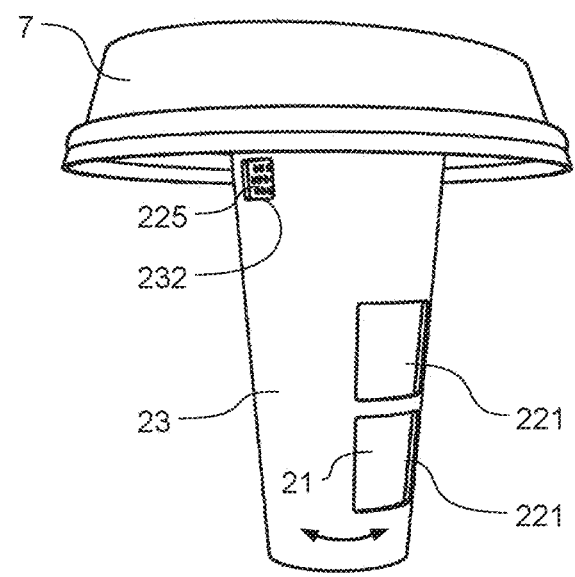
FIG. 3 schematically shows a perspective view of the example of FIG. 1 in a second state.

The passage 21 has a closed state in which the liquid 40 inside the infusion chamber is closed off from the liquid 41 in the cup outside the infusion chamber 2 and thus the concentration of the substances in the liquid in the exterior stopped from increasing. The cartridge 1 has a manual control 6 which is manually controllable by a human-being and allows to bring the passage 21 from the open state into the closed state, as illustrated in FIG. 3. It will be apparent from the FIGs. that in the shown example, the opening and closing is not motorized and that the cartridge does not have an actuator, e.g. an electromotor. A manual control is therefore the only manner in which a user can bring the opening into the open or closed state. This allows for a simple operation of the cartridge without a complex, e.g. battery operated, powered assembly being required.

Thus, by closing the passage 21 a consumer can manually control the strength of the tea to his or hers individual taste. The brewing of tea and especially the strength thereof can be stopped easily, without requiring to remove the cartridge 1 from the cup 100 as would be with the known tea-bag based solutions, and without requiring a dedicated computer interface to control the brewing.

Additionally, the cartridge 1 allows to avoid a messy situation with e.g. dripping tea-bags while providing a controllable brewing process. Furthermore, the infusion chamber 2 provides a confined and protecting environment for the tea leaves and thus allows to prepare tea of a higher quality.

Figure 4:
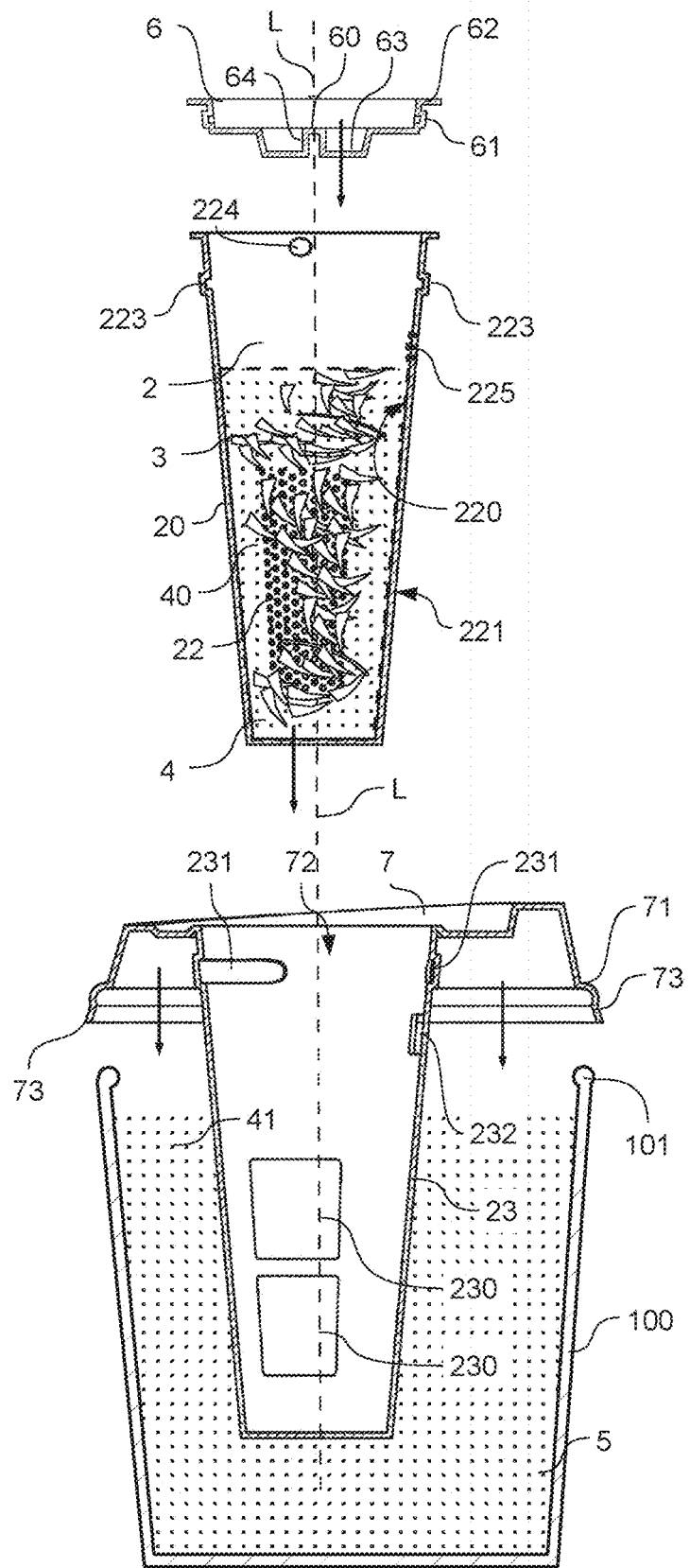
FIG. 4 schematically shows a cross-sectional view of the example of FIG. 1 with a cup.
Figure 5:
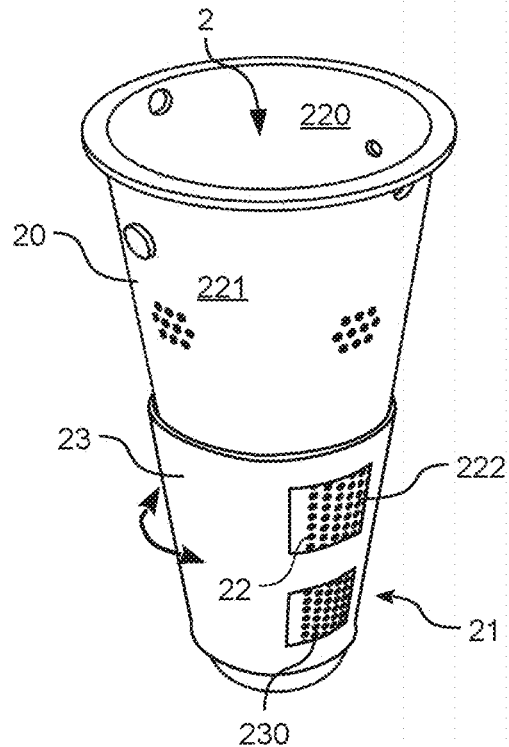
FIGS. 5-9 schematically shows a perspective view of other examples of a closable infusion chamber which are usable in a cartridge.

The cartridge 1 can be used to prepare tea (or other hot drinks or cold drinks—like citronade or mint water). FIG. 4 shows the cartridge 1 placed into a cup 100 which is filled with a liquid 4 and more specific shows that a cartridge 1 is provided on a top rim 101 of the cup 100. As illustrated in FIG. 4, in such a method the cartridge is placed in the cup 100 filled at least partially with a liquid 4 suitable to prepare tea, e.g. hot water, milk, lemon juice or other suitable (mixture of) liquid(s), and optionally flavourings like sugar, sliced lemon etc, for example with a temperature equal to or above 65° C., e.g. equal to or above 75° C. and less than boiling temperature, such as at or below 95° C., e.g. at or below 90° C., for example at or below 80° C. The cartridge 1 may be made of a material which withstands such hot liquid, and e.g. be a disposable cartridge such as made of (coated) paper or a suitable (thermo-)plastic as commonly known for disposable cups. Also, the disposable cartridge may be made of a bio-degradable material. Alternatively, the cartridge 1 can be non-disposable and e.g. be dishwasher proof, and e.g. made of a thermoset plastic, a thermoplastic with a glass transition point above 100° C., glass ceramics or other suitable non-disposable material.

When the tea leaves are brought into contact with the liquid 40 in the infusion chamber 2, substances from the tea leaves 3 will be released therein. When the passage 21 is open, the substances will be transported into the rest of the cup, e.g. by convection and/or diffusion. At a desired point in time, the passage 21 is brought in the closed state by a human-being, e.g. when the liquid 41 outside the infusion chamber 2 has a desired concentration of substances extracted from the tea leaves.

In the example of FIGS. 1-4, the passage 21 can also be brought from the closed state back into the open state. Thus, a consumer can for example stop the brewing by closing the passage 21, taste the tea to determine if the strength matches the consumer's personal preferences, and reopen the passage 21 if the prepared tea is not strong enough to the individual's taste. Also, this allows to refill the cup with new liquid and prepare several cups of tea with a single cartridge. In such a case the cartridge 1 may be releasably attached to the cup 100. Alternatively, the cartridge 1 may be permanently attached to the cup 1 to inhibit unwanted refills.

The cartridge 1 can e.g. be assembled with the passage 21 closed, such that the brewing does not start immediately upon bringing the cartridge 1 in contact with liquid in a cup 100 (either by placing the cartridge 1 in a liquid-filled cup or filling a cup in which the cartridge is placed with liquid) but only at a point in time the passage 21 is opened. This allows a user to select the point in time the liquid 41 outside the infusion chamber 2 actually starts being transformed into tea by opening the passage 21. Such can be convenient e.g. when the cup will be transported after filling with liquid and placing the cartridge, e.g. from the location where this takes place to a, relatively, remote location where the consumer will drink the tea (and after drinking dispose of at least the cartridge 1).

The infusion chamber 2 may be implemented in any manner suitable for the specific implementation. In the example, the infusion chamber has a defined shape determined by the chamber wall 20. The chamber wall 20 is impervious to the liquid 40 in the infusion chamber 2 and, under normal circumstances, retains its shape when brewing tea. The chamber wall 20 has a liquid tight inner surface 220 facing the infusion chamber 2, which defines the inside of the infusion chamber 2, and an outer surface 221 facing away from the infusion chamber towards the exterior 5.

The passage 21 comprises an opening 22 in the chamber wall 20 between the inner surface 220 and the outer surface 221. Although the opening may be shaped differently, in this example, the opening comprises a perforated region 222 of the chamber wall 20.

In the example of FIGS. 1-4, the chamber wall 20 is of a closed material, except for the perforated region 222. Thus, the opening can be created in a simple manner, e.g. by simply perforating the region 222, and allows to create a passage which can retain the tea leaves in the infusion chamber. The perforations can be sufficiently small to retain loose tea leaves in the infusion chamber 2, such as with a diameter equal to or less than 5 mm, e.g. equal to or less than 2 mm, such as equal to or less than 1 mm, although other sizes may be suitable as well.

In the shown example, the cartridge 1 further comprises an outer wall 23. The chamber wall 20 and the outer wall 23 are made of a material which is impervious to the liquid. Except for the opening 22, the chamber wall 20 thus closes-off the infusion chamber 2. Where the outer wall 23 covers the outer surface 221 of the chamber wall 20, these covered parts are separated, e.g. sealed, from the exterior 5 by the outer wall 23. When the outer wall 23 covers the opening 22, the opening 22 is thus closed off for the liquid 41 outside the infusion chamber 2.

As illustrated in FIGS. 2 and 3, the outer wall 23 is movable relative to the chamber wall 20 to cover, and close, the opening 22 in the chamber wall 20. This allows a mechanically simple manual control, e.g. by manually sliding, rotating or otherwise moving the outer wall 23 relatively to the chamber wall 20.

Figure 7:
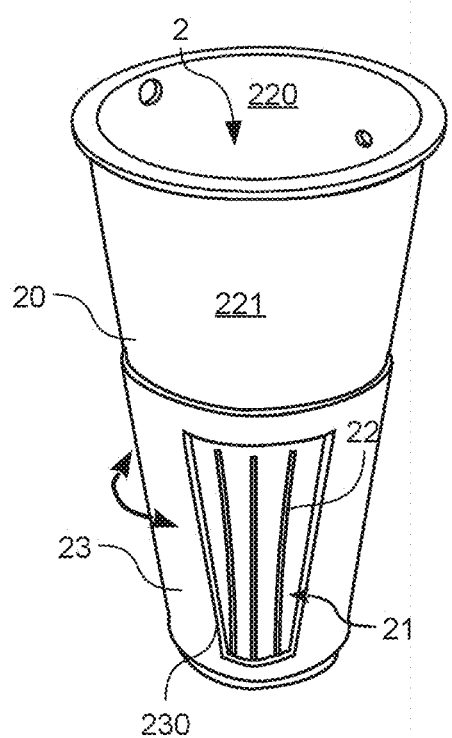

The double wall construction with a chamber wall and an outer wall which are movable relative to each other, allows the passage 21 to be implemented in various manners. In the example, the passage 21 includes one or more windows 230 in the outer wall 23, which leaves a part of the chamber wall 20 exposed. The manual control 6 engages in this example on the chamber wall 20 to move the chamber wall relative to the outer wall 23, to position the window 230 to overlap with the opening 22, in this example the perforated region 222, in the chamber wall and thereby bring the passage in the open state. However, the opening 22 in the chamber wall can be implemented differently and, e.g. as a window (see FIG. 8) or as one or more narrow slits, as can be seen in FIG. 7. Likewise, instead of the window 230, the outer wall 23 may be provided with another type of aperture, such as perforations, slides or otherwise which can be moved to expose the opening in the chamber wall 20 to the exterior 5, as e.g. shown in FIG. 8. Furthermore, the manual control 6 may, as e.g. shown in FIG. 10, engage on the outer wall 23 to move the outer wall relative to the chamber wall.

Figure 9:
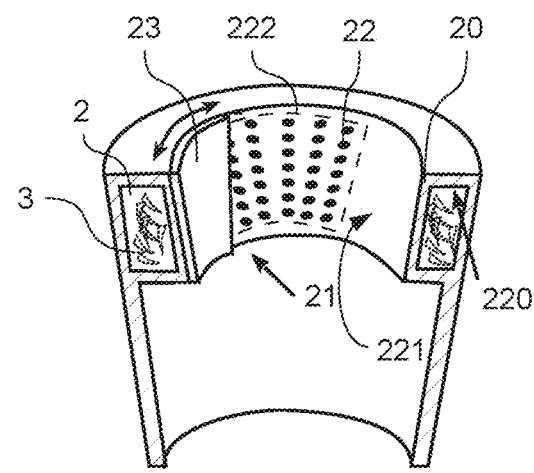
Figure 10:
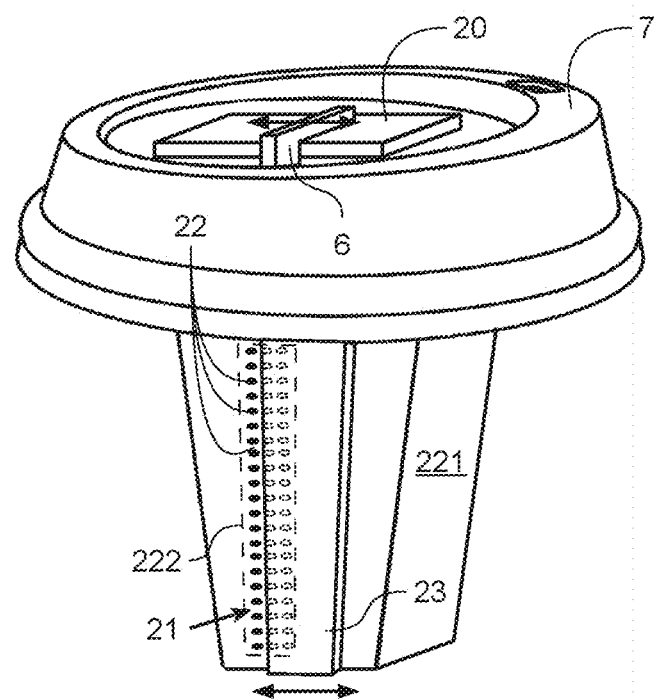
FIG. 10 schematically shows a perspective view of another example of a cartridge.

In the shown example, the chamber wall 20 is shaped as a container for the loose tea leaves and the outer wall 23 is shaped as a receptacle which holds the container. The container is movable relative to the receptacle to bring the passage into the open state or the closed state. This allows to assemble the cartridge 1 in a simple manner, by simply placing the container in the receptacle, as indicated with the arrows in FIG. 4. However, as e.g. seen in FIGS. 9 and 10, the chamber wall may have a different shape and, e.g. be a hollow ring or toroid which is provided on the radial inside with a passage 21 that can be closed-off by an outer wall that can move along the radial inside in tangential direction to cover or expose the passage 21. Also, the chamber wall 20 may e.g. be a rectangular cuboid as illustrated in FIG. 10, which allows to stack the chambers in an easy manner.

In the shown example, the cartridge comprises two interlocking members 20, 23 movable relative to each other. More specific, the chamber wall 20 is rotatable (relative to the outer wall 23) around a longitudinal axis L thereof and comprises a protrusion 223 at the outer surface. The outer wall is provided at an inside thereof with a groove 231 extending in tangential direction relative to the longitudinal axis in which the protrusion is movably accepted. Thus, a guided movement can be obtained without mechanical complexities, and as explained below in more detail this can be manually controlled and actuated in a simple manner by a user.

Additionally, the protrusion 223 and groove 231 provide an interlocking engagement between the members. If the members are resiliently deformable, the fixation can be obtained by simply inserting the protrusion into the groove with sufficient force. To obtain a releasable attachment, the groove 231 may extend to the entrance of the axial passage 72, which allows to slide the protrusion 223 into the groove without deformation. This allows to reuse the cartridge with fresh tea leaves.

As best seen in FIG. 1, in the example of FIGS. 1-5, the chamber wall 20 is shaped as a first tube with an outer diameter smaller than an inner diameter of the outer wall 23, which is shaped as a second tube. As shown, at least one of said tubes is closed off at a cup-side end, in the drawings at the bottom thereof. This ensures that the leaves and liquid are retained in the infusion chamber 2 when the passage is closed off. The second tube is open at a top side end, which allows to insert the first tube and, hence, assemble the cartridge 1. Such tubes can be shaped without undercuts and hence manufactured in a simple manner e.g. using a one-piece mould.

As shown, the tubes can fit tightly and an outer surface of the first tube abuts to an inner surface of the second tube when the first tube is inserted in the second tube. This allows to enable the movement while having a sufficient sealing of the opening when the passage 21 is closed.

The tubes are just an example where the outer wall 23 and the chamber wall 20 are both cup-shaped. Other types of cup shapes, such as conforming bowls or other shapes may be suitable as well.

The chamber wall 20 fits tightly into the outer wall. When moving the walls relative to each other there will, therefore, be some friction which allows to ensure that the outer wall seals of the covered parts of the chamber wall in a simple manner.

Figure 6:
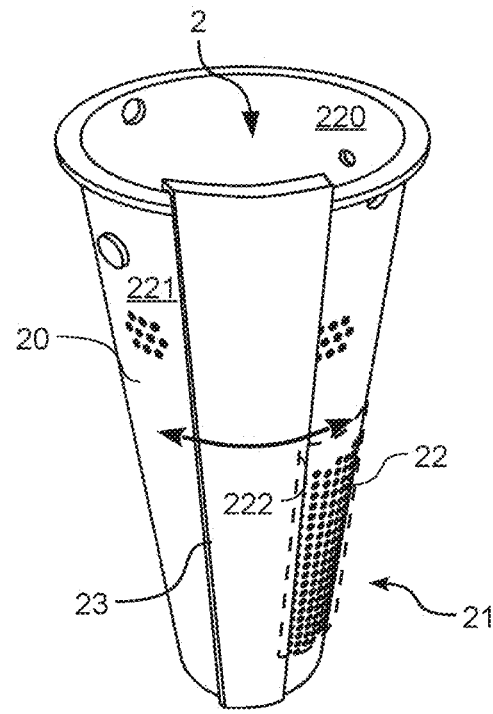
Figure 8:
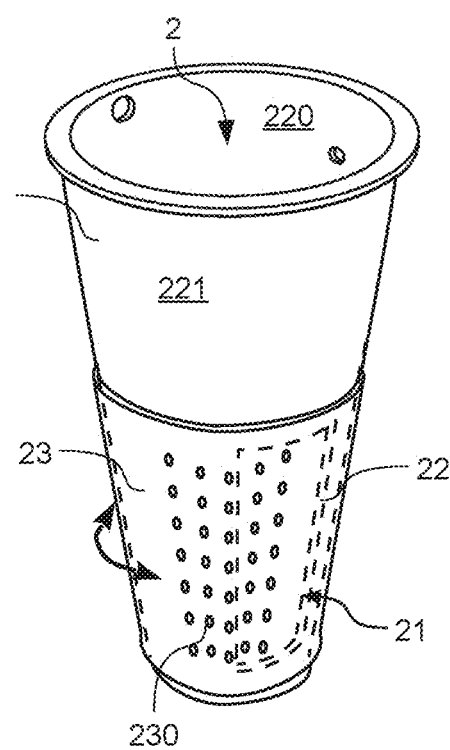

The outer wall 23 may have a different shape and for example, be a sheet which covers only a part of the chamber wall and which can be slid to cover the outer surface 222 or, as illustrated in FIG. 6, be a flat leg-shaped member which is slidably clamped on the chamber wall 20, as illustrated in FIG. 7, be a sleeve provided with a suitable aperture in which the container is inserted and which can be rotated to expose the opening in the chamber wall 20, as shown in FIG. 8 to just name a few.

Referring back to FIGS. 1 and 5, in the example the cartridge 1 comprises a top, lid-shaped portion 7 which allows to cover the cup 100. The lid-shaped portion 7 covers the cup and thus reduces heat losses and accordingly slows down the dropping of the temperature of the tea. The lid-shaped portion 7 is provided with a drinking funnel 70 which enables the user to drink the liquid 41 in the cup outside the infusion chamber 2 when the cartridge 1 is in place. The portion 7 has an outer annular flange 71, which interlocks with the top-rim 101 of the cup, which is suitable for a disposable cartridge 1. In case of a non-disposable cartridge, the cartridge 1 may releasably attached to the cup 100, e.g. using a water tight releasable seal.

The example of FIGS. 1-4 comprises an excess liquid outlet 225 in the chamber wall which is located above the passage, for transferring excess liquid from the infusion chamber 2 when the cartridge 1 is tilted around a horizontal axis. The outer wall is provided with a corresponding window 232 which is open when the passage 21 is closed, to drain excess liquid from the chamber 2 when drinking. More specifically, when the cup in which the cartridge is tilted to start drinking, the excess liquid outlet 225 will be at the lower side (i.e. towards the user) and excess liquid will be drained out of the chamber into the exterior by gravity. When the cup is turned back in upright position, the liquid level outside the chamber will be lower than the excess liquid outlet 225 and, hence, not flow back into the chamber. This allows to avoid messy situations caused by a dripping container.

The excess liquid outlet enables easy mass production of the product while allowing to remove the excess fluid from the chamber. Additionally or alternatively, the excess liquid outlet enables as well to establish a circulating liquid flow between the chamber and the inside of the cup, which mixes the content of the chamber with the liquid inside the cup, e.g., to extract flavoring substances from the tea-leaves or to dissolve soluble substances (such as sugar or milk powder). This obviates the need for mechanical components, such as, for example a mixer, or the use of a spoon by the consumer.

In the example of FIGS. 1-5, the chamber wall 20 extends from the lid-shaped portion 7 and encloses the infusion chamber. More specific, in this example, the lid-shaped portion 7 is part of an integral member which is formed into the outer wall 23. As best seen in FIG. 1, the lid-shaped portion 7 has an annular shape attached to the outer wall 23, such that the outer wall forms a pouch-shaped receptacle behind the axial passage 72 of the annular shape in which the chamber wall 20 can be received. Said differently, the axial passage 72 is a blind hole in which the infusion chamber fits.

The lid-shaped portion 7 has a shape which allows it to be nested with similar components. Likewise, the chamber wall 20 has a shape which allows it to be nested with similar components. More specifically, the axial passage 72 and the chamber wall 20 have a tapered shape, which narrows towards the bottom. This allows to nest multiple chamber walls and to nest multiple lid-shaped portions 7. In addition, this provides a strong construction which resists torque induced deformation with a relatively thin wall, which in addition can be mass manufactured with a mould.

In the shown example, in addition, the lid-shaped portion 7 is strengthened to withstand torque induced deformation. More specifically, the annular lid has a rim which projects upwards and which, in this example, has a cross section of a U-shape turned upwards down, with a skirt which forms the flange which projects downwards to interlock on the rim of the cup. The rim on the lid has thus been elevated, which provides additional strength to withstand the friction, and torque resulting therefrom, when opening and closing the chamber wall by rotating the chamber. This strengthening allows to have relatively thin, not so rigid, material like thermoplastics or paper.

The chamber wall 20 can be inserted through the axial passage into the receptacle, i.e. the outer wall 23. Thus, for example, a cup 100 can be prefilled with hot liquid and covered with the lid-shaped portion 7 to avoid the liquid from cooling too fast and sometime later the container 22 with tea leaves inserted into the receptacle to start the brewing in the infusion chamber 2.

In this example, the chamber wall 20 can be inserted into the receptacle by exerting a force until the protrusion 223 interlocks with the groove 231 and, hence, is attached to the receptacle. This allows a permanent, movable attachment and hence, is suitable for a disposable cartridge.

As shown, the cartridge 1 can comprise a cover 6 for covering a top-side of the space (i.e. the infusion chamber 2) enclosed by the chamber wall 20 and which interlocks therewith. Thereby, e.g. the infusion chamber 2 can be pre-filled with loose tea leaves, closed off and be placed on for instance the shelf to wait for a customer to order a cup of tea.

In the shown example, the cover 6 can exert a force on the chamber wall to move the chamber wall. The cover is provided with a grip 60 for manually moving the chamber wall 20 relative to the outer wall 23. More specifically, the grip 60 is formed by a ridge which extends radially through the axial centre of the cover and which allows to manually rotate the cover which is transferred through the interlocking attachment to the chamber wall 20 and will thus, rotate the chamber wall 20 relative to the outer wall 23, to open or close the passage 21. Said differently, the cover 6 is shaped as a rotary knob rotatable relative to the outer wall and mechanically attached to the chamber wall 20 to transfer the rotational movement of the rotary knob to a rotational movement of the chamber wall 20.

As best seen in FIG. 4, the shown example of a cover 6 has a rim 62, which interlocks with the chamber wall 20. More specifically, the rim 62 is provided with one or more protrusions 61 which fit into a hole 224 in the chamber wall 20. Thus, when the cover 6 is placed with some pressure on the open side of the chamber wall 20, the chamber wall 20 and the cover 6 will slightly be deformed by the protrusion until it fits into the hole 224, and the cover 6 thus locks with the chamber wall 20. In the shown example, the cover 6 locks permanently, i.e. is not releasable without excessive force and without damaging the cover 6, and/or the chamber wall 20. This allows to stop unwanted reuse by e.g. refilling the chamber 2 with fresh leaves after use. However, alternatively, the cover 6 may be releasable attached to the chamber wall, e.g. by a threaded connection. The attachment of the cover 6 to the wall 20 allows to exert a rotating force on the chamber wall 20.

In the shown example, a user can exert the force by inserting his or her fingers into an annular recess 63 enclosed by the rim 62. An elongated projection 60 is located in the recess. The elongated projection 60 has sidewalls 64, which project from the bottom 63 of the recess 64, which the user can pinch between his fingers because the distance between the sidewalls and the rim is sufficient to admit a finger top in the recess between the elongated projection and the rim. The rotating force on the projection 60 will rotate the cover 6 and, by the interlocking attachment, rotate the chamber wall 20. In the recess, a second elongated projection 60 may be provided which extends perpendicular to the first elongated projection, such that a cross-shaped grip is obtained. By a suitable dimensioning of the recess, the user can rotate the chamber wall with four fingers. This allows for a more controlled rotation with less force per finger being required.

The control, e.g. cover 6, and the lid-shaped portion 7 may both be provided with an optical marker to indicate their relative position, and allow a user to identify whether or not the passage 21 is open or closed. In the example of FIGS. 1-4 for example, the elongated projection 60 itself can be used as an optical marker and the lid-shaped portion 7 can be provided with one or more indicator(s), towards which the elongated projection 60 points, when the passage 21 is open or closed.

In the shown example, the cover 6 is separated from the cup. However, the cover 6 may be attached to the cup, or to the cartridge prior to use, e.g. by tearable strip between the cover and the other part.

In the shown examples, the outer wall and/or the chamber wall and/or the cover each have a top side with a shape which conforms to the bottom side. Thus, the outer wall and/or the chamber wall and/or the cover are nestable and several outer walls and/or chamber walls and/or covers can be stacked onto each other in a compact manner.

Figure 11:
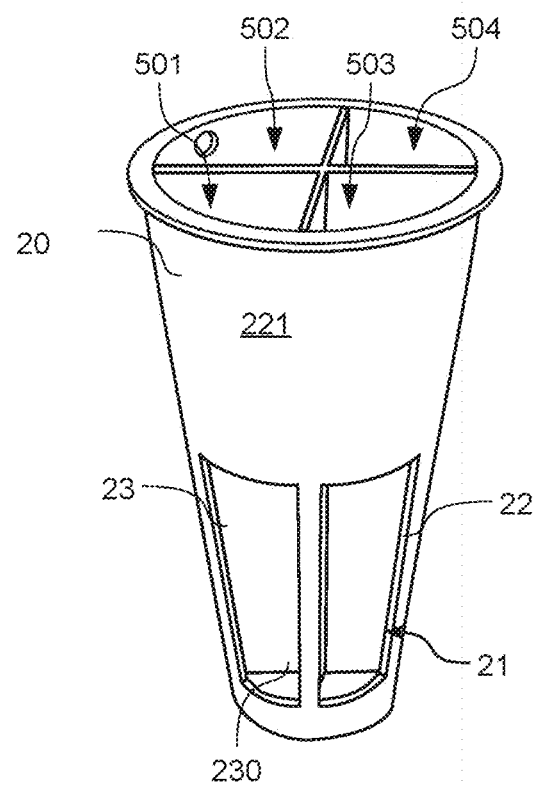
FIG. 11 shows a perspective view of an example of multi-compartment chamber.

The cartridge can be compartmentalized in order to provide more variation of the extracts as well as usage of sugar, syrup and the sorts. As illustrated in FIG. 11, instead of a single chamber, for example, the cartridge may include various chambers 501-504 filled with flavoring substances, such as solid, non-soluble parts from which flavoring substances can be extracted or extracts (i.e. concentrated flavoring liquids or soluble solids). Each of the chambers has a respective passage in the chamber wall. A controlled release of the different flavoring substances into the cup can then be obtained by opening and closing the passages in an order and for a duration controlled by the consumer. For example, one or more chambers with aromatic flavorings may be opened first to give the liquid a base flavoring, such a tea, fruit or other flavor, and closed after a period of time determined by the consumer. Thereafter, a chamber with a sweeting flavoring, e.g. sugar or another soluble sweetener, can be opened, which again is closed after a period of time determined by the consumer. Also, a chamber with e.g. dairy products may be provided, such as with milk powder or sterilized milk.

In addition, or alternatively, in the cartridge sealed-off reservoirs (pre-)filled with extracts may be provided, which are sealed-off with a sealing strip. The reservoirs may be opened to release the extract by removing, e.g. tearing, the sealing strip from the reservoir, which allows the extract to mix with the liquid. The sealing strip then ensures that the cartridge with extract will not leak until usage in the lid.

It can also be imagined that advertisement or other graphics can be printed on the side of the cartridges and the lid during production. For example, at a top of the lid-shaped portion 7 or other position visible to the outside world during the brewing, the graphics may be printed (e.g. by applying a suitable ink or paint pattern, engraving or otherwise).

The cartridge, and the cup (if provided with the cartridge), may be manufactured in any manner suitable for the specific product. For example, the components may be manufactured with one or more of the production methods summarized below, not leaving out other production methods. For example, the cartridge may be manufactured with:
- extrusion;
- blow extrusion;
- injection molding;
- blow molding;
- rotational molding; or
- any other suitable production methods.

The product and its components can be made from any suitable material or combination of disposable or non-disposable materials, such as metal, glass, plastic or cardboard. The material may e.g. be a recyclable material or a biodegradable material, for example. Below is a summary of possible materials, which could be used although other materials can be suitable for production as well.

Materials:
- Aluminium
- glass
- wood
- plastics

Suitable plastic-based materials may for example be:
- Plastic coated paper;
- Polystyrene or Styrofoam;
- Polypropylene (PP);
- Polyvinyl chloride (PVC);
- Polyethylene (high or low density HDPE/LDPE) and or polyethylene Terephthalate (PETE); or
- other plastics.

Suitable paper and/or paperboard materials can for example be:
- Paper
- Paperboard
- Corrugated fiberboard
- Molded pulp from recycled newsprint or from other materials The paper or cardboard materials may e.g. be coated or non-coated with additional materials like plastic amongst other materials.

Alternative materials (natural and/or biodegradable and/or composite) can for example be:
- Combination of natural starches, recycled fibers, water, air and natural minerals;
- PLA (polylactic acid);
- Mixture of PLA and pulp fibers;
- Composite or mixture of starch and other materials such as Limestone and recycled fibers to provide additional strength;
- Dry fallen leaves of trees like the areca catechu palm (betel tree) which are collected and hot pressed into the desired form of the lid;
- PDC (prodegradant concentrates) containing polymers (PDC's);
- Biodegradable plastic made from e.g. milk protein, like casein;
- Keratin based water resistant thermoplastic, e.g. made of chicken feathers;
- Liquid wood which feels and acts like plastic and is biodegradable.
- Polycaprolactone polyesters degradable after weeks of composting.
- Biodegradable plastics of polyhydroxyalkanoate polyesters;
- Crystallized Poly Lactic Acid;
- Cellulose based materials.

In the foregoing specification, the invention has been described with reference to specific examples of embodiments of the invention. It will, however, be evident that various modifications and changes may be made therein without departing from the broader scope of the invention as set forth in the appended claims. For instance, although the preceding tea leaves have been described, it will be apparent that the term "tea leaves", as used herein, refers to actual tea leaves, but may additionally or alternatively, comprise other solid particles in the chamber which release flavorizing substances in hot water, such as herbs, sliced citrus fruits, or otherwise. Likewise, it may comprise or consist of another flavouring substance or substances, such as non-soluble solid particles which release such substance, soluble solid particles, or a liquid flavouring (such as a liquid extract or concentrate).

Also, the various components may be made from the same materials, or from different materials, in order to achieve optimal strength and closure of the liquids. For instance, where in the examples or claims a chamber wall 20 is shown, it will be apparent that this implies that the wall 22 retains under normal circumstances its shape when brewing tea, but that the wall may be subject to some resilient or plastic deformation when opening or closing the passage 21.

Also, in the examples the outer wall closes or seals of the covered parts of the chamber wall. It will be apparent that this does not need to be a liquid tight seal and that some liquid may seep between the chamber wall and the outer wall as long as for practical purposes the concentration of tea in the cup outside the infusion chamber does not noticeably increase during typical use.

Furthermore, although in the figures the cartridge is shown as an assembled product, the cartridge 1 may be provided as a kit of parts, as a container or other type of infusion chamber which can be filled with loose tea leaves and closed (e.g. by placing a cover on an open top-side of the container, and which can be placed in a receptacle to obtain an assembled product. Likewise, the cartridge can be provided as part of an assembly of a cartridge and a cup and for example be packaged together.

The cartridge and cup can be made of any suitable material, such as coated or waxed paper or plastic.

Furthermore, although in the example the passage 21 is provided at the longitudinal surface or side of the chamber 2, it will be apparent that e.g. the chamber wall may be provided with a passage at the bottom which can be opened/closed with a rotary disk. Likewise, although in the examples the outer wall 23 is movable in tangential direction of the chamber 2, it will be apparent that e.g. in FIGS. 5-8, the chamber wall 20 may be non-tapered and the outer wall 23 movable in longitudinal direction of the chamber wall 20. Furthermore, the passage may e.g. be closable by moving the outer wall downwards relative to the chamber wall (or vice versa), i.e. in a longitudinal direction from the top of the cartridge towards the bottom to cover the passage.

Also, in the shown examples, the passage has a small dimension, sufficiently small to retain the solid, non-soluble parts of the flavoring substances (i.e. in the examples the tea-leaves) in the chamber. However, the passage may have a larger diameter, larger than those parts and e.g. be covered with a filtering mesh to retain the parts.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances, such that the embodiments of the invention described herein are, for example, capable of operation in other orientations than those illustrated or otherwise described herein.

Likewise, where a movement of an object is described (e.g. relative to another object) it will be apparent that this is a relative movement, and accordingly depending on the chosen reference frame, the object may be moving relative to an observer while the other object is static, the other object may be moving while the object is static relative to the observer or both objects may be moving, but differently, relative to the observer.

Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A cartridge for controlled brewing of loose-leaf tea in a cup, the cartridge comprising:
   a top, lid shaped portion for engaging with a top rim of the cup and covering the cup, the lid shaped portion being provided with a hole and a receptacle which extends from the hole towards a cup-side end of the cartridge;
   an infusion chamber received in the receptacle, for containing loose tea leaves and infusing a liquid with substances from the tea leaves to brew tea;
   a chamber wall which is impervious to the liquid and which defines the infusion chamber;
   a plurality of passages in the chamber wall between the infusion chamber and an exterior thereof, the exterior being inside the cup when the cartridge has been placed on to the cup and the lid covers the cup, the passages having:
      an open state in which the passages and the infusion chamber are in liquid communication with the exterior, to transport the substances from the liquid in the infusion chamber into liquid in the exterior during brewing tea, and
      a closed state in which the passages and the liquid inside the infusion chamber are closed off from the liquid in the exterior to stop a concentration of the substances in the liquid in the exterior from increasing;
   the receptacle comprising an outer wall which covers at least a part of an outer surface of the chamber wall, the chamber wall and the outer wall of the receptacle being movable relative to each other to cover and close the passages in the chamber wall;
   an excess liquid outlet in the chamber wall located above the passages and an opening in the outer wall of the receptacle corresponding to the excess liquid outlet allowing communication of the excess liquid outlet with the exterior, wherein when the passages are in the closed state, excess liquid from the infusion chamber will be transferred to the exterior via the excess liquid outlet when the cartridge is tilted around a horizontal axis; and
   a manual control manually controllable by a human-being to move the outer wall of the receptacle and the chamber wall relative to each other, for bringing during brewing the passage from the open state into the closed state.

2. The cartridge as claimed in claim 1, wherein:
   the chamber wall has a liquid tight inner surface facing the infusion chamber which defines the inside of the infusion chamber, and an outer surface facing away from the infusion chamber towards the exterior;
   the passages comprise openings in the chamber wall between the inner surface and the outer surface; and
   the chamber wall is movable relative to the outer wall of the receptacle to cover and close the openings of each of the plurality of passages in the chamber wall.

3. The cartridge as claimed in claim 2, wherein the inner surface encloses the infusion chamber and wherein the outer wall of the receptacle is impervious to the liquid in the exterior and closes a portion of the outer surface of the chamber wall covered by the outer wall from the liquid in the exterior.

4. The cartridge as claimed in claim 2, wherein:
   the passages each include an aperture in the outer wall which leaves a part of the outer surface of the chamber wall exposed and wherein the chamber wall is movable relative to the outer wall of the receptacle, to position each of the apertures to overlap with the opening in the chamber wall and thereby bring the passages in the open state.

5. The cartridge as claimed in claim 4, wherein:
   the chamber wall is shaped as a first tube, the first tube having an outer diameter smaller than an inner diameter of the outer wall, which is shaped as a second tube, at least one of said tubes being closed off at a cup-side end thereof and the second tube being open at a top side end for inserting the first tube.

6. The cartridge as claimed in claim 5, wherein:
   an outer surface of the first tube abuts to an inner surface of the second tube when the first tube is inserted in the second tube.

7. The cartridge as claimed in claim 4, wherein:
   the outer wall and the chamber wall are both cup-shaped and the chamber wall fits into the outer wall to seal the opening in the chamber wall when the passage is closed.

8. The cartridge as claimed in claim 4, comprising:
   two interlocking members movable relative to each other, and wherein the chamber wall is part of a respective one of the members; and
   wherein
   the chamber wall is rotatable relative to the outer wall around a longitudinal axis thereof and comprises a protrusion at the outer surface, and wherein the outer wall is provided at an inside thereof with a groove extending in tangential direction relative to the longitudinal axis in which the protrusion is movably accepted to guide the rotating movement.

9. The cartridge as claimed in claim 2, wherein:
the chamber wall is of a closed material and the openings comprise a perforated region of the chamber wall, with perforations sufficiently small to retain loose tea leaves in the infusion chamber.

10. The cartridge as claimed in claim 2, wherein the top, lid-shaped portion comprises:
a drinking funnel to enable drinking the liquid in the cup outside the infusion chamber when the cartridge is placed on to the cup and covers the cup, and wherein the chamber wall extends from the lid-shaped portion and encloses the infusion chamber;
a cover for covering the hole and a top-side of the chamber wall, the cover interlocking with the chamber wall.

11. The cartridge as claimed in claim 10, wherein:
the cover is provided with a grip for manually moving the chamber wall relative to the outer wall.

12. The cartridge as claimed in claim 1, wherein:
the top, lid-shaped portion is provided with a drinking funnel to enable drinking the liquid in the cup outside the infusion chamber when the cartridge is placed on to the cup and covers the cup, and wherein the chamber wall extends from the lid-shaped portion and encloses the infusion chamber.

13. The cartridge as claimed in claim 12, comprising:
two interlocking members movable relative to each other, and wherein the chamber wall is part of a respective one of the members, and
wherein
the top, lid-shaped portion is part of a respective other member and has an outer annular flange to interlock with a top-rim of the cup.

14. The cartridge as claim 1, wherein
the infusion chamber is filled with loose tea leaves.

15. The cartridge as claimed in claim 1, wherein the cartridge is made of disposable material, and optionally wherein the cartridge is disposable.

16. A method of preparing tea, comprising:
placing a cartridge as claimed in claim 1 in a cup filled at least partially with a liquid suitable to prepare tea, a space of the cup outside the infusion chamber forming the exterior; and
manually bringing the passages of the cartridge to the closed state by a human-being at a desired point in time to stop a concentration of substances extracted from the tea leaves in the exterior from increasing.

17. A cartridge for controlled brewing of loose-leaf tea in a cup, the cartridge comprising:
a top, lid shaped portion for engaging with a top rim of the cup and covering the cup, the lid shaped portion being provided with a hole and a receptacle which extends from the hole towards a cup-side end of the cartridge;
an infusion chamber received in the receptacle, for containing loose tea leaves and infusing a liquid with substances from the tea leaves to brew tea;
a chamber wall which is impervious to the liquid and which defines the infusion chamber, the chamber wall having a liquid tight inner surface facing the infusion chamber which defines the inside of the infusion chamber, and an outer surface facing away from the infusion chamber towards the exterior;
a plurality of passages in the chamber wall between the infusion chamber and an exterior thereof, the exterior being inside the cup when the cartridge has been placed on to the cup and the lid covers the cup, the passages having:
an open state in which the passages and the infusion chamber are in liquid communication with the exterior, to transport the substances from the liquid in the infusion chamber into liquid in the exterior during brewing tea, and
a closed state in which the passages and the liquid inside the infusion chamber are closed off from the liquid in the exterior to stop a concentration of the substances in the liquid in the exterior from increasing;
the plurality of passages comprising an opening in the chamber wall between the inner surface and the outer surface and the receptacle comprising an outer wall which covers at least a part of an outer surface of the chamber wall, the chamber wall and the outer wall of the receptacle being movable relative to each other to cover and close the opening in the chamber wall;
an excess liquid outlet in the chamber wall located above the passages and an opening in the outer wall of the receptacle corresponding to the excess liquid outlet allowing communication of the excess liquid outlet with the exterior, wherein when the passages are in the closed state, excess liquid from the infusion chamber will be transferred to the exterior via the excess liquid outlet when the cartridge is tilted around a horizontal axis;
a manual control manually controllable by a human-being to move the outer wall and the chamber wall relative to each other, for bringing during brewing the passage from the open state into the closed state, the manual control comprising a cover for covering the hole and a top-side of the chamber wall,
the cartridge having at least one of options (i) and (ii),
option (i):
the cover is provided with a grip for manually moving the chamber wall relative to the outer wall and the cover interlocking with the chamber wall, the grip comprising an elongated projection with sidewalls for manually exerting a moving force, and
the cover comprising:
an annular, upright rim which interlocks with the chamber wall, and a recess enclosed by the rim, and recessed relative to a top of the rim, in which the elongated projection is located;
the sidewalls of the elongated projection projecting from a bottom of the recess upwards, towards an upper side of the cover where the top of the rim is located, a distance between a respective sidewall and the rim being sufficient to admit a fingertip in the part of the recess between the sidewall and the rim;
option (ii):
the chamber wall is rotatable relative to the outer wall around a longitudinal axis of the chamber wall, and the chamber wall comprises a protrusion at the outer surface, and wherein the outer wall is provided at an inside thereof with a groove extending in tangential direction relative to the longitudinal axis in which the protrusion is movably acceptable to guide the rotating movement, and the chamber wall is permanently, movably attachable into the receptacle by exerting a force until the protrusion interlocks with the groove.

18. A cartridge for controlled brewing of loose-leaf tea in a cup, the cartridge comprising:
- a top, lid shaped portion for engaging with a top rim of the cup and covering the cup, the lid shaped portion being provided with a hole and a receptacle which extends from the hole towards a cup-side end of the cartridge;
- an infusion chamber receivable in the receptacle, for containing loose tea leaves and infusing a liquid with substances from the tea leaves to brew tea;
- a chamber wall which is impervious to the liquid and which defines the infusion chamber;
- a plurality of passages in the chamber wall between the infusion chamber and an exterior thereof, the exterior being inside the cup when the cartridge has been placed on to the cup, and the lid covers the cup, the passages having:
  - an open state in which the passages and the infusion chamber are in liquid communication with the exterior, to transport the substances from the liquid in the infusion chamber into liquid in the exterior during brewing tea, and
  - a closed state in which the passages and the liquid inside the infusion chamber are closed off from the liquid in the exterior to stop a concentration of the substances in the liquid in the exterior from increasing;
- the receptacle comprising an outer wall which covers at least a part of an outer surface of the chamber wall, the chamber wall and the outer wall of the receptacle being movable relative to each other to cover and close the passages in the chamber wall;
- an excess liquid outlet in the chamber wall located above the passage passages and an opening in the outer wall of the receptacle corresponding to the excess liquid outlet allowing communication of the excess liquid outlet with the exterior wherein when the passage passages are in the closed state, transferring excess liquid from the infusion chamber will be transferred to the exterior via the excess liquid outlet when the cartridge is tilted around a horizontal axis; and
- a manual control manually controllable by a human-being to move the outer wall and the chamber wall relative to each other, for bringing during brewing the passage from the open state into the closed state during brewing;
- the cartridge having a nestable-shape;
- the outer wall having a tapered shape, in which an outer wall of a second cartridge can be nested, the tapered shape narrows towards a bottom of the receptacle; and
- the chamber wall having a tapered shape, in which a chamber wall of the second cartridge can be nested, the tapered shape narrowing from a top of the infusion chamber towards a bottom of the infusion chamber.

* * * * *